United States Patent [19]
Niewiadomski et al.

[11] Patent Number: 4,914,367
[45] Date of Patent: Apr. 3, 1990

[54] OPERATING DEVICE FOR THE COVER OF A SLIDING AND LIFTING SUNROOF

[75] Inventors: Klaus Niewiadomski, Lorsch; Dimitrios Mecheridis, Eppelheim, both of Fed. Rep. of Germany

[73] Assignee: Gaus Mikrotechnik GmbH & Co., Heidelberg, Fed. Rep. of Germany

[21] Appl. No.: 276,524

[22] Filed: Nov. 28, 1988

[30] Foreign Application Priority Data

Dec. 7, 1987 [DE] Fed. Rep. of Germany ....... 3741419

[51] Int. Cl.$^4$ .............................................. G05B 1/06
[52] U.S. Cl. .................................... 318/663; 318/624; 318/628; 296/221; 296/222; 296/223
[58] Field of Search ....................... 318/663, 624, 628; 296/221, 222, 223

[56] References Cited
U.S. PATENT DOCUMENTS 3,829,155  8/1974  Lutz ..................................... 296/223
4,556,835 12/1985  Vogel et al. ......................... 318/663
4,600,237  7/1986  Huber et al. ......................... 296/223

Primary Examiner—William M. Shoop, Jr.
Assistant Examiner—Saul M. Bergmann
Attorney, Agent, or Firm—Sixbey, Friedman, Leedom & Ferguson

[57] ABSTRACT

Operating device for the cover of a sliding and lifting sunroof of a motor vehicle having a desired value transmitter and an actual value transmitter for controlling the sliding sunroof function and the lifting roof function via an actuator that is part of a control circuit. By the control circuit, the desired value signal supplied by the desired value transmitter and corresponding to the respective desired position of the cover selected is compared with an actual value signal of the actual value transmitter corresponding to the respective actual position of the cover to cause the cover position to be adjusted until the actual cover position matches that desired. The operating element of the desired value transmitter is mounted, to slide for producing for a sliding of the cover, and to swing for producing a cover tilting-out movement. The value transmitter produces a desired value signal that varies in dependence with the angle of the operating element to control the cover tilt-out movement in dependence upon sliding of the operating element control the cover sliding movement.

17 Claims, 6 Drawing Sheets

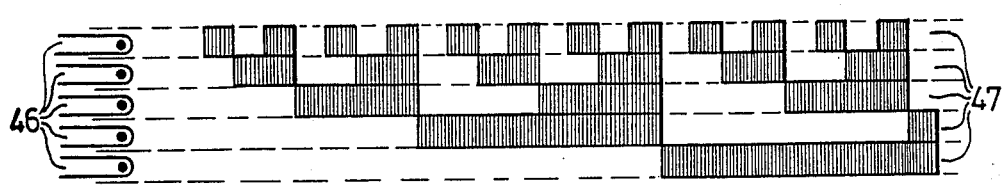
FIG. 9
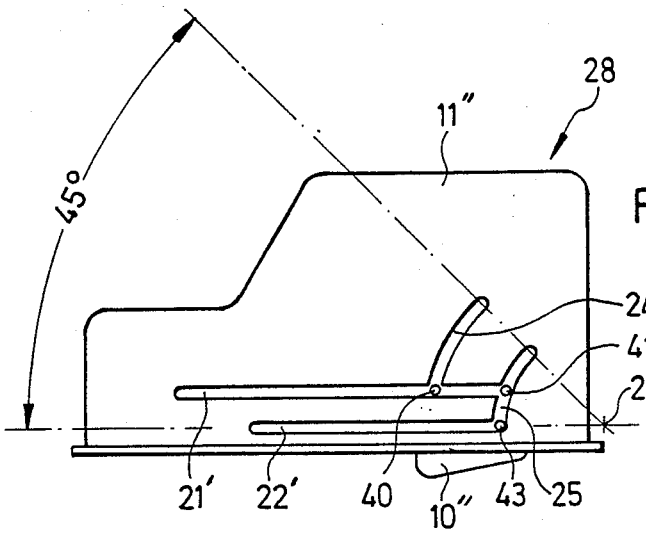
FIG. 10
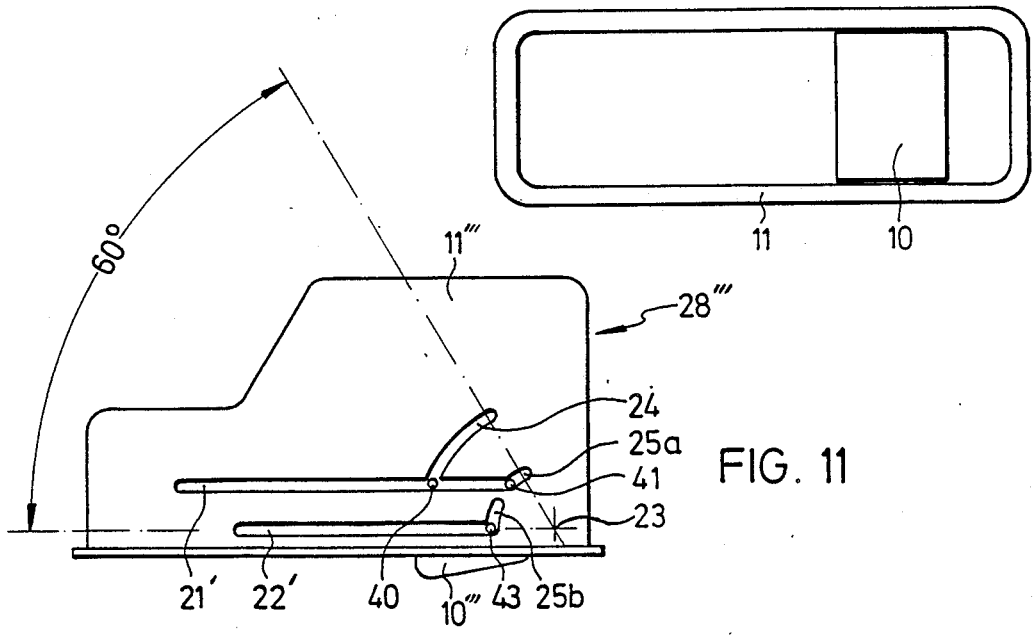
FIG. 12
FIG. 11

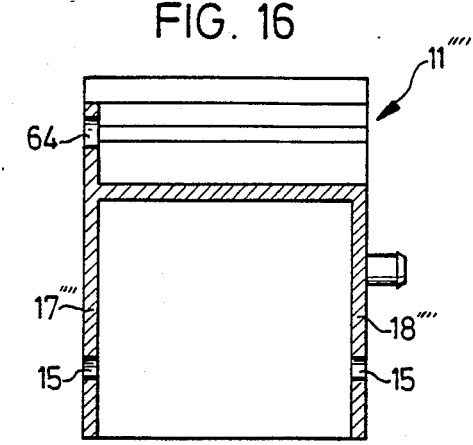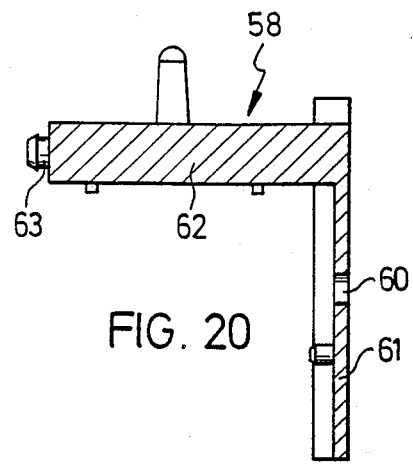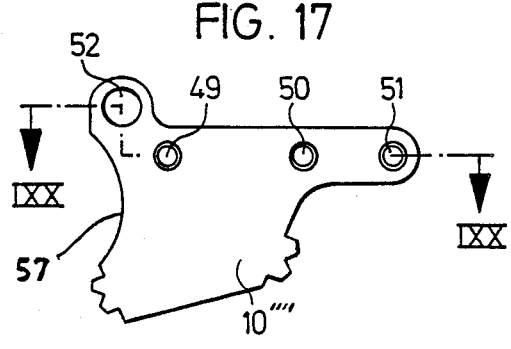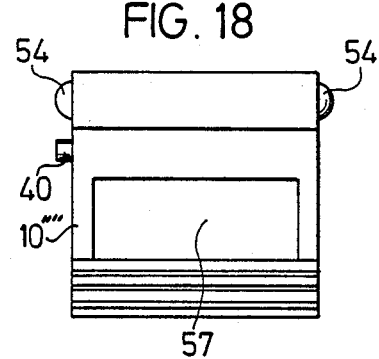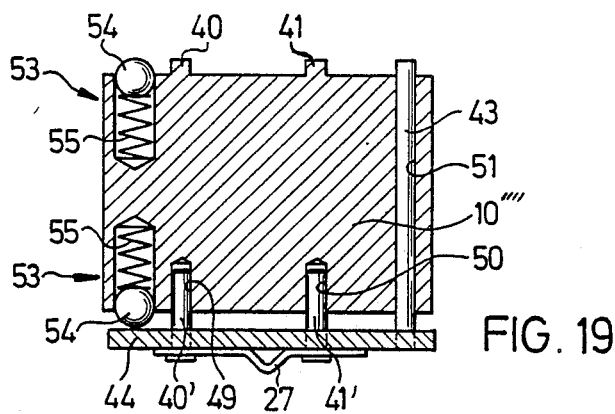

OPERATING DEVICE FOR THE COVER OF A SLIDING AND LIFTING SUNROOF

BACKGROUND OF THE INVENTION

The invention relates to an operating device for the cover of a sliding and lifting sunroof of a motor vehicle of the type having desired value and actual value transmitters for the sliding function and for the lifting roof function as well as with an actuator that is part of a control circuit by which the desired value signal that is supplied by the desired value transmitter, and that corresponds to the desired position of the cover selected in each case, is compared with a respective actual value signal, that corresponds to the actual position of the cover, so as to cause the actual cover position to be adjusted until its positional deviation from that desired has become zero.

In a known operating device of this kind (U.S. Pat. No. 4,556,835), the operating element of the desired value transmitter is a potentiometer that is set by a control knob or a sliding lever and can be adjusted between two end positions, e.g., from fully lifted to fully retracted, by turning or sliding thereof through a reference intermediate position that corresponds to a zero position of the roof, e.g., the closed roof position. The turning or sliding of the operating element between the one end position and the reference intermediate position controls the sliding function, while the lifting roof function is controlled by turning or sliding the operating element between the reference intermediate point and the other end position. The stationary display symbols assigned to the adjustable operating element indicate to the user the direction in which the operating element is to be adjusted for the respective, desired movement. However, in adjusting the operating element, there exists a certain danger that, by watching the operating element and the associated display symbols, the attention of the driver is diverted from driving events.

It is also known (U.S. Pat. No. 4,600,237), in controlling the movement of a sliding and lifting sunroof, to provide a switch with an operating element that is supported to have a swinging movement to activate the lifting roof function, and is supported to slide to activate the sliding sunroof operation. However, such a switch is, basically, unsuited as a desired value transmitter for a servomechanism of the type developed according to the invention. That is, for such a switch (which opens and closes one or more circuits, instead of producing a variable signal) to be usable in place of a desired value transmitter, for example, as is used in U.S. Pat. No. 4,556,835, a switch of the type disclosed would require as many stationary switch contacts as thereare positions into which the cover can be moved. Thus, while it may be theoretically possible to emulate the operation of a variable signal transmitter via a multiple contact switch, in practice it would not be feasible to provide, perhaps, for more than one or two intermediate positions to be produced in addition to the end positions of travel. This result is because the switch would become too complicated and too bulky to allow installation in the restricted space available in a typical car, should a large number of stationary switch contacts (for example, 50) have to be provided, as would be necessary to approach the infinitely variable position control capabilities obtainable by a desired value transmitter, such as one utilizing a potentiometer.

SUMMARY OF THE INVENTION

The primary object of the present invention is to further develop an operating device of the type initially mentioned above so that the cover can be brought into the respective desired position safely and simply, even without looking at the operating element of the desired value transmitter.

In accordance with preferred embodiments of the present invention, this object is achieved, with an operating device of the type initially mentioned above, by mounting the operating element of the desired value transmitter to slide for producing the cover sliding movement and, to swing for producing the swinging-out lifting movement of the cover so as to generate a desired value signal that is dependent on the respective angle of the operating element to control the swinging-out movement of the cover as well as to generate a desired value signal to control sliding movement of the cover dependent on the respective sliding position of the operating element.

In the operating device made according to the present invention, the operating element of the desired value transmitter simulates the cover displacement movement during the sliding sunroof function and also during the lifting roof function. Because the desired cover position in each case is imitated with the operating element of the desired value transmitter, the cover can be adjusted safely and simply, even without the use of display symbols and without the driver having to divert his glance from driving events.

The desired value transmitter can be made as an analog device, in particular a potentiometer, or as a digital signal generator. Accordingly, one or more sliding contacts can be attached to the operating element so as to work together with an electric resistance path fixed to the housing or with coded, electric contact paths fixed to the housing.

In another embodiment of the invention, the operating element of the desired value transmitter is guided to slide and to swing on slide guides relative to a transmitter housing on at least one side, and preferably, on both sides. The slide guide can suitably be made as a multipoint guide that possesses at least one straight slide slot extending in the sliding direction of the operating element and at least one circularly arc-shaped slide slot in the transmitter housing that opens into the straight slide slot. At least two slide pins that are attached to the operating element so as to lie one behind the other in the sliding direction of the operating element are adjustably guided in the slide slots.

Preferably, there is further provided at least one ball detent for reasonably locking the operating element in at least one predetermined position with reference to the transmitter housing.

In another embodiment of the invention, the operating element is guided slidably between two parallel side walls of the transmitter housing and is connected to a contact carrier that is placed on the outer side of a housing side wall. Additionally, a separate side part is attached on the transmitter housing and carries at least one electrically conducting path on an inner side that faces the housing side wall and that lies at a distance from it, the electrically conducting path working with at least the one sliding contact sitting on the contact carrier. These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 9 is an enlarged diagrammatic depiction of the sliding contacts and the coded electric contact paths of the desired value transmitter according to FIGS. 7 and 8;

FIGS. 10 and 11 are side views of the desired value transmitters according to two other modified embodiments;

FIG. 12 is a frontal view of the desired value transmitter according to FIGS. 7 and 8, or 10 and 11;

FIG. 16 is a cross-sectional view of the desired value transmitter housing taken along line XVI—XVI of FIG. 13.

FIGS. 17 and 18 are a side view and a front view, respectively, of the operating element of the desired value transmitter;

FIG. 19 is a section through the operating element taken along broken line IXX—IXX of FIG. 17, and with a contact carrier plate connected to the operating element being additionally represented;

FIG. 20 is a section through a desired value transmitter side part taken along line XX—XX of FIG. 21;

Throughout the drawings, like reference numerals have been utilized to designated like elements in the various embodiments, with prime (') designations being utilized to indicate where such elements have been modified from one embodiment to another.

DETAILED DESCRIPTION OF THE PREFERRED EMBODIMENTS

Figure 1:
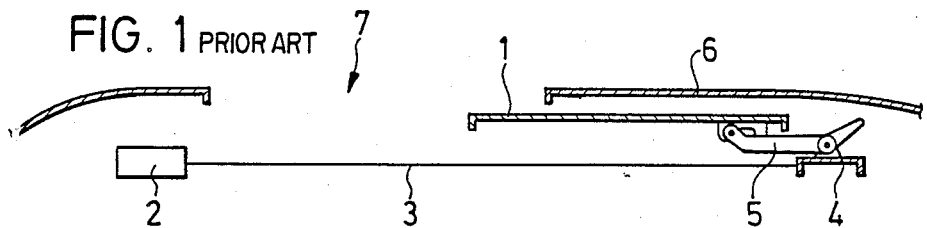
FIGS. 1 to 3 diagrammatically depict a sliding and lifting sunroof in the slid-back position, closed position and tilted-out position, respectively.
Figure 2:
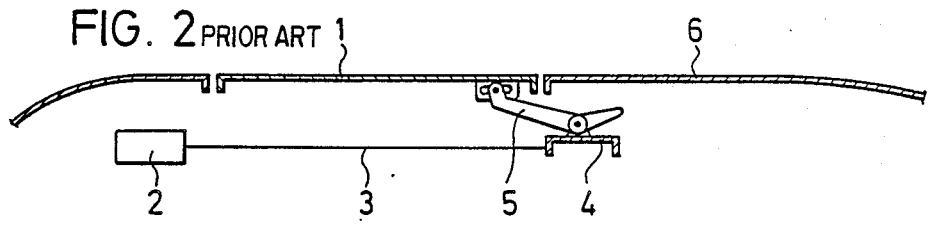
Figure 3:
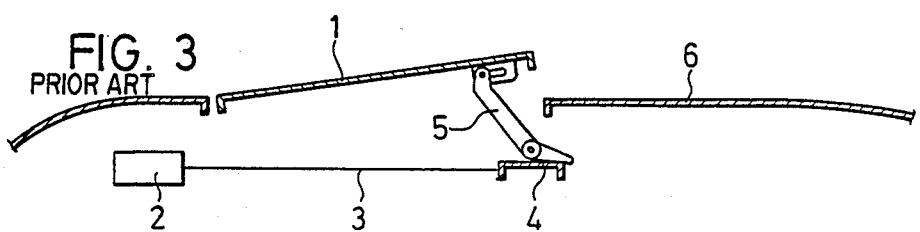

The lifting sunroof of a motor vehicle shown diagrammatically in FIGS. 1 to 3 has a cover 1 which, by a reversible motor 2, is displaceable by one or more transfer elements 3 (suitably in the form of incompressible cables), a transport bridge 4 and a tilt-out mechanism 5. In the retracted position according to FIG. 1, cover 1 is slid back under a stationary roof part 6 to at least partially expose a roof opening 7. In the closed position according to FIG. 2, cover 1 closes the roof opening 7. By further forward movement of transport bridge 4, starting from the closed position according to FIG. 2, tilt-out mechanism 5 is made to swing cover 1 around a pin near the front edge of the cover 1 and, thus, lifts the rear edge of cover 1 above stationary roof part 6 into the upwardly tilted-out position of FIG. 3. The terms "front" and "rear" are used here with reference to the motor vehicle and its forward driving direction. To the extent described so far, such structure is known and represented by Vogel, et al. U.S. Pat. No. 4,556,835.

Figure 4:
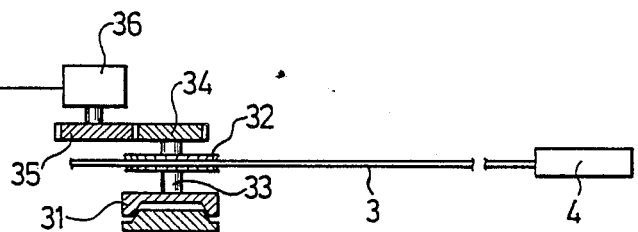
FIG. 4 is a diagrammatic representation of a control circuit for producing the positions of FIGS. 1-3.

Motor 2 is in a servocontrol control circuit as is shown diagrammatically in FIG. 4. Here, a desired value transmitter 28 converts the position of an operating element 10 (FIGS. 5 to 8, 10 to 12 and 17 to 19) set by the driver into an electrical desired value signal that is transmitted to a controller 30 by a line 29. Transfer element 3 is driven by electric motor 2 by a slip clutch 31 and a pinion 32. On pinion shaft 33 there sits a gear 34 that mates with a gear 35 on the control shaft of an actual value transmitter 36, for example, in the form of a multiple-turn potentiometer. Actual value transmitter 36 converts the actual position of cover 1 into an electrical actual value signal that is transmitted to controller 30 by a line 37.

The desired position of cover 1 is set at operating element 10. Depending on the position of operating element 10, desired value transmitter 28 supplies a desired value signal to controller 30. If this desired value signal indicates that the cover position desired deviates from the actual position represented by the actual value signal supplied by actual value transmitter 36, controller 30 applies a drive signal by a line 38 to motor 2. Motor 2 drives cover 1 by slip clutch 31 and pinion 32. Because of the movement of cover 1, the actual value signal produced by actual value transmitter 36 to line 37 changes. As soon as the actual value signal matches the desired value signal, controller 30 causes the drive signal on line 38 to become zero, and motor 2 stops. As a result, cover 1 is stopped in the position predetermined by setting of operating element 10.

The control circuit can be designed to operate on an analog or digital or mixed analog-digital basis in the way known from German Offenlegungsschrift No. 33 24 107 or from the corresponding U.S. Pat. No. 4,556,835.

Figure 5:
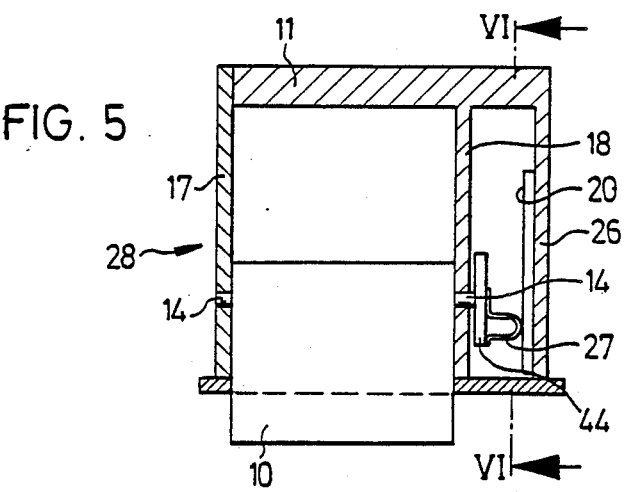
FIG. 5 is a section through a desired value transmitter taken along line V—V of FIG. 6.
Figure 6:
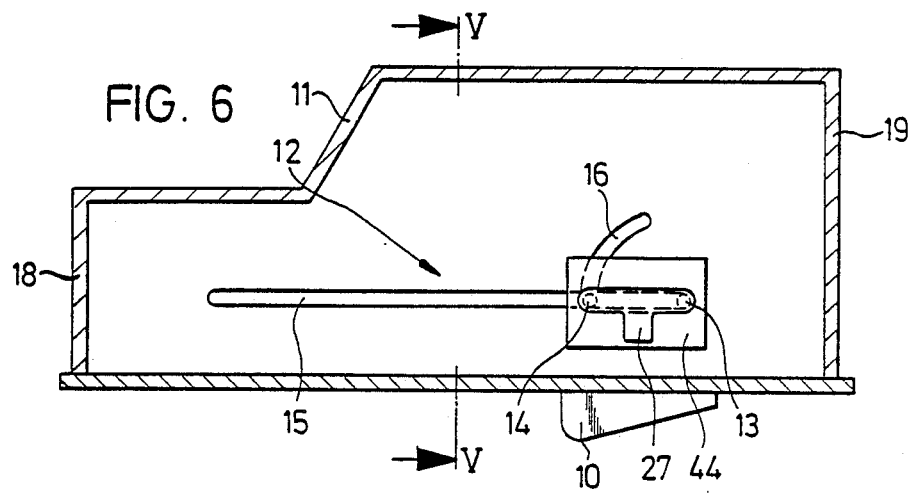
FIG. 6 is a section of the desired value transmitter taken along line VI—VI of FIG. 5.

In the embodiment of desired value transmitter 28 shown in FIGS. 5 and 6, operating element 10 is guided on both sides, relative to a transmitter housing 11, to slide in a two-point slide guide 12 for the sliding roof movement and to swing for a swinging roof movement. Each two-point slide guide 12 is comprised of two slide pins 13 and 14. Pins 13,14 lie one behind the other in the sliding direction of operating element 10 and project from operating element 10 on both sides. Each slide guide 12 is also comprised of slide slots 15 and 16 that are made in side walls 17 and 18 of transmitter housing 11. Slide slots 15, in side walls 17 and 18, are straight and extend in the sliding direction of operating element. Slide slots 16, on the other hand, are circularly arc-shaped and their center of curvature coincides with the right end of slide slot 15 or with slide pins 13 in FIG. 6, when operating element 10 assumes the right end position shown in FIG. 6. Each slide slot 16 opens into a respective slide slot 15 at a distance from the ends of the latter, and extends from there upward. The distance between slide pins 13 and 14 is selected so that slide pin 14 is at the junction of slide slot 16 and slide slot 15 when operating element 10 is in its end position according to FIG. 6.

Desired value transmitter 28 is, preferably, installed in the vehicle so that slide slots 15 run parallel to the vehicle's longitudinal direction and housing front wall 19, shown to the right in FIG. 6, faces in the direction of the vehicle's travel. Thus, setpoint value generator 28 can be installed, for example, in the vehicle roof (in a manner not shown) in front of the forward edge of roof opening 7 in the direction of travel. The same applies also for the other modified embodiments described below.

In the case of the embodiment according to FIGS. 5 and 6, operating element 10 works together with an analog signal generator part, in the form of a potentiometer-resistance path 20, that is fixed to the transmitter housing 11 and that is on the inner side of an outer housing wall 26 that runs parallel to and at a distance from side wall 18. For this purpose, a sliding contact 27 is provided in sliding contact with resistance path 20. Sliding contact 27 is attached on a side of a contact carrier plate 44 facing resistance path 20. Contact carrier plate 44 is connected to operating element 10 by the respective slide pins 13 and 14, which project through the side wall 18, at the appropriate side of operating element 10. Optionally, to increase the safety of the contact closure, two or more sliding contacts 27 can be provided redundantly.

The design of desired value transmitter 28 is made so that a desired value signal corresponding to the closed roof position is issued when operating element 10 assumes the position shown in FIG. 6 in which, for this embodiment, slide pins 13 strike the forward end of slide slots 15 and slide pins 13 and 14 are aligned with each other, in the direction of slide slot 15. To move cover 1 and, for example, bring it out of the position according to FIG. 2 into the position according to FIG. 1, operating element 10 is slid rearwardly an appropriate distance (in FIG. 6, to the left), and slide pins 13 and 14 run in slide slots 15. With a rearward shifting of operating element 10, cover 1, thus, performs a corresponding rearward sliding movement, in the vehicle's longitudinal direction.

In contrast if, starting from the position of operating element 10 according to FIG. 6, the operating element is swung around pins 13 at the front (right in FIG. 6) end of slide slot 15, slide pins 14 enter the circularly arc-shaped slide slots 16. In this case, the desired value transmitter 28 supplies a desired value signal which, by the servocontrol control circuit, results in a corresponding swinging movement of cover 1 from the closed position (FIG. 2) to the tilted-out position (FIG. 3).

The interaction of slide pins 13 and 14 with slide slots 15 and 16 prevents operating element 10 from being slidably moved when the operating element swung out of the position according to FIG. 6, and vice versa. For convenient grasping, the operating element 10 can, in a way not shown for this embodiment, be provided, on its left side in FIG. 6 with a suitable recessed grip, such as that shown and described relative to FIGS. 17 and 18.

With regard to the following further embodiments of the invention, only those aspects of structure and operation which differ in some respect will be described, for the most part. Thus, any aspect of these embodiments not expressly described should be considered to be the same as for the corresponding aspect of the initially described embodiment of FIGS. 5 and 6, while the basic characteristics described relative to FIGS. 1-3 are applicable to all embodiments of the invention.

Figure 7:
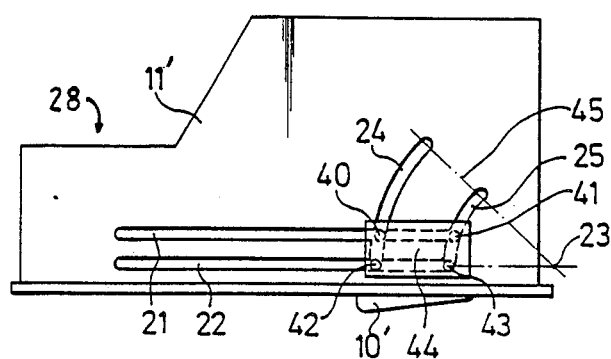
FIGS. 7 and 8 are a side view and a front view of a desired value transmitter according to a modified embodiment of the invention.
Figure 8:
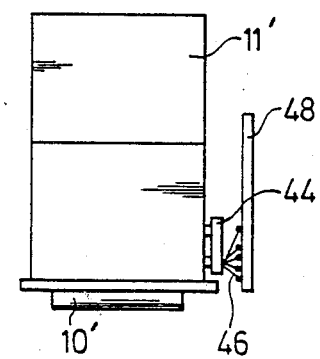

In the modified embodiment according to FIGS. 7 and 8, a multipoint guide is provided with two parallel, straight slide slots 21 and 22 that extend in the sliding direction of operating element 10' as well as with two circularly arc-shaped slide slots 24 and 25 that have a common center of curvature 23. Slide slots 24 and 25 intersect upper, straight slide slot 21 and open into the upper side of lower, straight slide slot 22. Operating element 10' has, at least on one side, four slide pins 40, 41, 42 and 43. The pairs of slide pins 40 and 41 and slide pins 42 and 43 are each lined up with the other in the sliding direction of operating element 10' so as to be slidable along slide slots 21 or 22, respectively, by actuation of operating element 10'. If operating element 10' is in the end position according to FIG. 7, that corresponds to the closed roof position according to FIG. 2, operating element 10' can also be swung upward around center of curvature 23, with slide pins 40 and 42 running in slide slot 24 and slide pins 41 and 43 running in slide slot 25. At the upper ends of slide slots 24, 25, slide pins 40 and 41 lie on a common radius 45 extending from center of curvature 23.

In the embodiment according to FIGS. 7 and 8, five sliding contacts 46 are attached on a contact carrier plate 44 that is connected to operating element 10'. Sliding contacts 46 interact with five contact paths 47 (FIG. 9). made according to any selected code, that are formed on a plate 48 that is with the desired value transmitter housing 11'. In this way, a digital desired value transmitter may be obtained, since various combinations of one or more of contacts 46 will make electrical contact with paths 47 as contacts 46 translate across plate 48. For example, as contacts 46 are moved rightward from the position shown in FIG. 9, first a signal 1,0,0,0,0 will be produced, followed by 0,1,0,0,0, then 1,1,0,0,0, etc. In the diagrammatic representation of FIG. 9, only the contact paths assigned to one part of the longitudinal extension of straight slide slots 21 and 22 are shown. It is to be understood that sliding contacts 46 cross over corresponding contact paths of contact carrier plate 44 also during the swinging out of operating element 10'. The number of contact paths 47 and sliding contacts 46 is selected depending on the desired control to be obtained and it is, thus, not limited to five.

In the case of the further modified embodiment according to FIG. 10, in transmitter 28'' slide pin 42 is eliminated and slide slot 24' does not extend to slide slot 22' but rather ends at slide slot 21'. In the further modified embodiment according to FIG. 11, instead of slide slot 25, transmitter 28'''' utilizes two partial slots 25a and 25b, each of which is connected to only one of slide pins 21 or 22. In this case, also, only three slide pins 40, 41 and 43 are provided.

FIGS. 13 to 16 show a desired value transmitter housing 11'''' of a further modified embodiment of a desired value transmitter 28'''' provided with a three-point slide guide. In both side walls 17'''' and 18'''' of housing 11'''', a straight slide slot 15' and two circularly arc-shaped slide slots 24'' and 25'' are formed. Slide slots 24'' and 25'' open into the upper side of slide slot 15 at a distance from the ends of the latter. Slide slots 24'' and 25'' have a common center of curvature 23 that coincides with the front end, i.e., the right end in FIGS. 13 and 15, of slide slot 15. The upper ends of slide slots 24'', 25'' lie on common radius 45.

Transmitter housing 11'''' has an open bottom side, and operating element 10'''' (FIGS. 17 to 19) is installed between side walls 17'''' and 18''''. Slide pins 40 and 41 interact with slide slots 15, 24″ and 25″ of side wall 17″″, and are formed as one piece with operating element 10″″ at one side thereof. On the opposite side of operating element 10″″ there is provided a pair of blind holes 49 and 50 that are axially lined up with slide pins 40 and 41 for receiving slide pins 40′, 41′, respectively. Slide pins 40′, 41′ extend, in the installed state, through slide slots 15, 24″, 25″ of housing side wall 18″″. In a bore hole 51 of operating element 10″″, whose axis lies in the same plane as the axes of slide pins 40, 40′, 41, 41′, there is slide pin 43 that is slidably guided in slide slot 15 of both side walls 17″″, 18″″. Contact carrier plate 44 is located at the side of side wall 18″″ that faces away from operating element 10″″ and it is connected to operating element 10″″ by slide pins 40′, 41′ and 43, which project through side wall 18 and engage in corresponding bore holes of contact carrier plate 44. Bore holes 52, each of which opens to one side of operating element 10″″, each receive a ball detent 53. Each of the two ball detents 53 has a detent ball 54 and a spring 55 that applies a force urging this ball outwardly. Detent balls 54 interact with detent openings 56 in side walls 17″″ and 18″″ (FIGS. 13 and 15) to reasonably hold operating element 10″″ in the respective end positions as well as predetermined intermediate positions, relative to generator housing 11″″. A recessed grip of operating element 10″″ is indicated in FIG. 18 at 57.

On transmitter housing 11″″ according to FIGS. 13 to 16, there is clipped a side part 58 shown in detail in FIGS. 20 to 23. For this purpose, the transmitter housing has two slotted, springy detent bolts 59 that project outward from side wall 18 and that interact with detent openings 56 in a side wall 61 of side part 58, while slotted, springy detent bolts 63 are formed on a terminal carrier 62 of side part 58 that is at a right angle to side wall 61. Detent bolts 63 engage in detent openings 64 of housing side wall 17.

Side walls 18 and 61 border, in the assembled state of transmitter housing 11 and side part 58, with a chamber being formed between both side walls for receiving contact carrier plate 44, similar to the way this is represented in the right part of FIG. 5. Potentiometer resistance path 20 is made on the inner side of side wall 61 facing side wall 18 (FIG. 22); path 20 interacts with at least one sliding contact 27 sitting on contact carrier plate 44.

Figure 13:
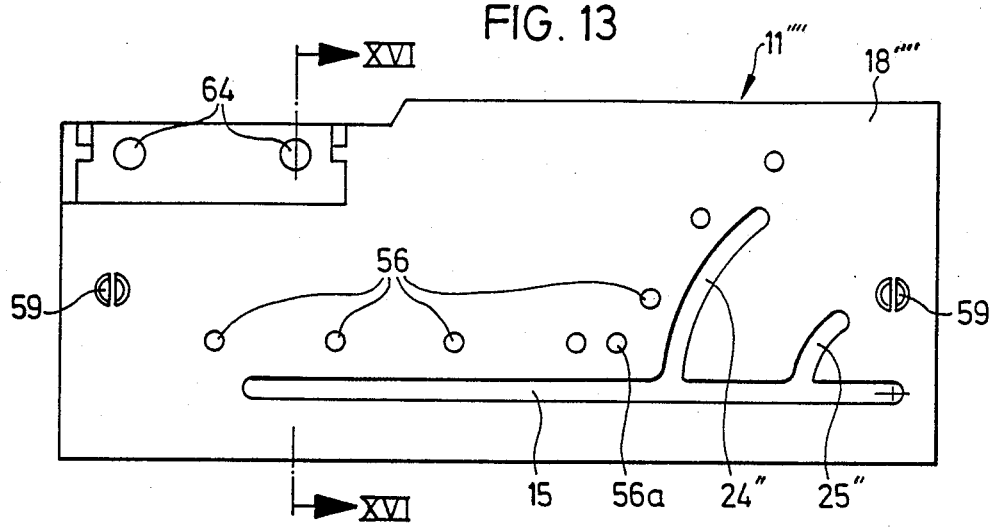
FIG. 13 is a side view of the desired value transmitter according to another modified embodiment.
Figure 14:
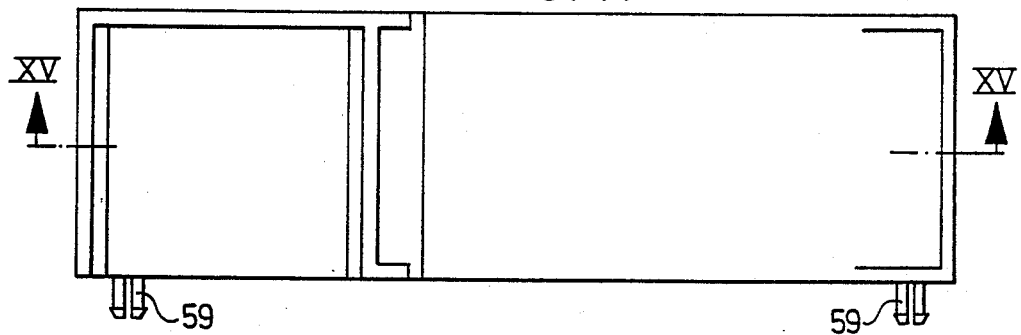
FIG. 14 is a top view of the housing of the embodiment according to FIG. 13.
Figure 15:
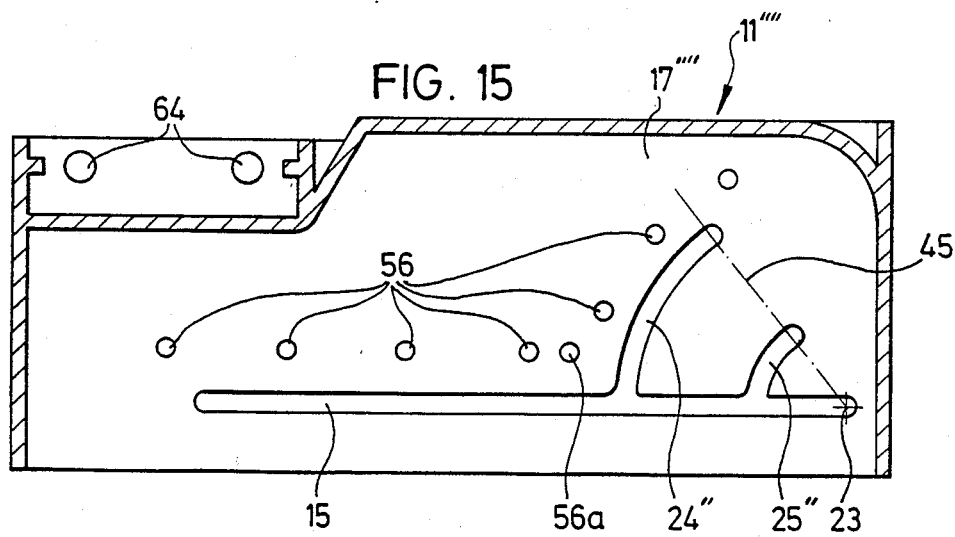
FIG. 15 is a longitudinal section through the desired value transmitter housing taken along line XV—XV in FIG. 14.
Figure 21:
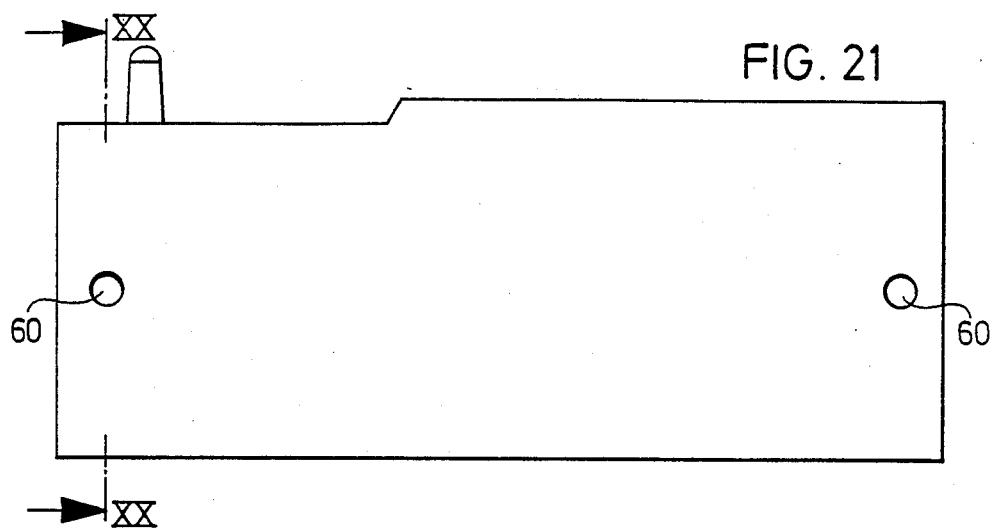
FIGS. 21 and 22 are views of the outside and inside of the side part according to FIG. 20.
Figure 22:
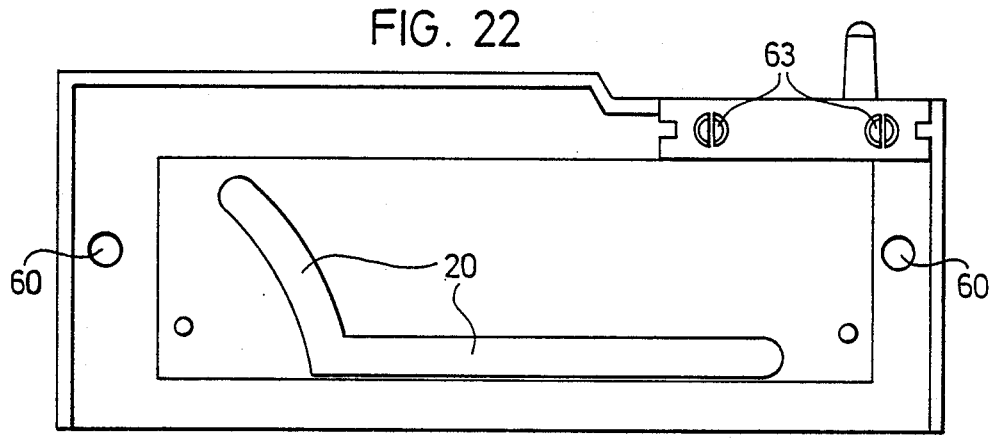
Figure 23:
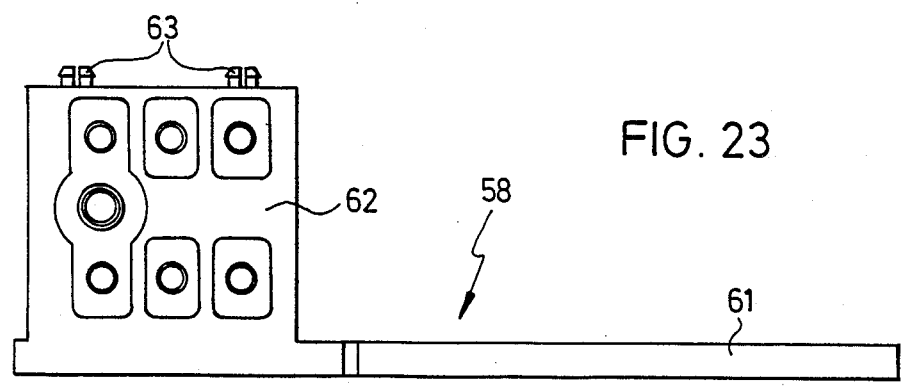
FIG. 23 is a top view of the side part according to FIGS. 20 to 22.

When operating element 10″″, which is installed in its forward end position in desired value transmitter 28″″ in a vehicle, a position in which all slide pins are in slide slots 15 of side walls 17″″, 18″″ and slide pin 43 strikes the right end of slide slot 15 in FIGS. 13 and 15, the interaction of sliding contact 27 and resistance path 20 causes a desired value signal to be produced that corresponds to the closed position of cover 1 shown in FIG. 2. In this position of operating element 10″″, slide pins 40, 40′, 41, 41′ are lined up with the outlets of slide slots 24″ and 25″ in slide slot 15. Detent balls 54 are engaged in one of detent openings 56 (and specifically detent openings 56a in FIGS. 13 and 15). Starting from this position, operating element 10″″ can, in a readily apparent way, be slid backward or be swung upward around the axis of slide pin 43, which is disposed at center of curvature 23, to transmit, depending on the respective position of sliding contact 27 on resistance path 20, position desired value signals that cause, by controller 30, a sliding (FIG. 1) or a tilting out (FIG. 3) of cover 1. However, after operating element 10″″ is slidout of the position described above, a swinging of the operating element is prevented because at least slide pin pair 40, 40′ cannot leave slide slot 15 at any other sliding position of the operating element. Vice versa, operating element 10″″ is prevented from making a sliding movement once it has been swung out of the position corresponding to the closed roof position because slide pins 40, 40′, 41, 41′ will strike the rear limiting walls of slide slots 24″ and 25′, should such be attempted. Inadvertent operations are thus precluded.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. In an operating device for a displaceable cover of a sliding and lifting sunroof of a motor vehicle of the type having a desired value transmitter, an actual value transmitter, and an actuator forming part of a control circuit, by which a desired value signal supplied by the desired value transmitter and corresponding to a respective selected desired position of the cover is compared with an actual value signal supplied by the actual value transmitter corresponding to a respective actual position of the cover and the position of the cover adjusted until actual and desired positions coincide, the improvement wherein an operating element of the desired value transmitter is mounted so as to enable it to slide and swing in a manner corresponding to a cover sliding movement and a swinging out movement of the cover as a means for causing the desired value transmitter to issue a cover swinging movement controlling desired value signal which varies, upon swinging of the operating element, dependent on the respective angle of the operating element and upon sliding the operating element to issue a cover sliding movement controlling desired value signal which varies dependent on the respective sliding position of the operating element; and wherein desired value transmitter is a digital device.

2. Operating device according to claim 1 wherein said digital device comprises sliding contacts attached to the operating element that interact with coded, electrical contact paths fixed to a housing of the desired value transmitter.

3. In an operating device for a displaceable cover of a sliding and lifting sunroof of a motor vehicle of the type having a desired value transmitter, an actual value transmitter, and an actuator forming part of a control circuit, by which a desired value signal supplied by the desired value transmitter and corresponding to a respective selected desired position of the cover is compared with an actual value signal supplied by the actual value transmitter corresponding to a respective actual position of the cover and the position of the cover adjusted until actual and desired positions coincide, the improvement wherein an operating element of the desired value transmitter is mounted so as to enable it to slide and swing in a manner corresponding to a cover sliding movement and a swinging out movement of the cover as a means for causing the desired value transmitter to issue a cover swinging movement controlling desired value signal which varies, upon swinging of the operating element, dependent on the respective angle of the operating element and upon sliding the operating element to issue a cover sliding movement controlling desired value signal which varies dependent on the respective sliding position of the operating element; and wherein the operating element of desired value transmitter is guided on at least one side, to slide and to swing relative to a transmitter housing on slide guides.

4. Operating device according to claim 3 wherein the slide guide is made as a multipoint guide that comprises at least one straight slide slot extending in a sliding direction of the operating element and at least one circularly arc-shaped slide slot in the transmitter housing which opens into the straight slide slot as well as at least two slide pins that are attached to the operating element so as to lie one behind the other in the sliding direction of the operating element, said slide pins being slidably guided in the slide slots.

5. Operating device according to claim 4 wherein the multipoint guide is a two-point guide having a single said straight slide slot and a single said circularly arc-shaped slide slot that opens out into the straight slide slot intermediate opposite ends thereof as well as two said slide pins, one of which, in the position of operating element corresponding to a closed position of the cover, is at one end of the straight slide slot, while the other of which is at the outlet of the circularly arc-shaped slide slot into the straight slide slot, and wherein the center of curvature of the circularly arc-shaped slide slot lies at said one end of the straight slide slot.

6. Operating device according to claim 4 wherein the multipoint guide is a three-point guide having a single said straight slide slot, two said circularly arc-shaped slide slots opening into said straight slide slot and three said slide pins, one of which, in the position of the operating element corresponding to a closed position of the cover, is at one end of the straight slide slot while the other two of which are each at a respective outlet of said circularly arc-shaped slide slots into the straight slide slot, and wherein the centers of curvature of the circularly arc-shaped slide slots coincide with each other and lie at said one end of the straight slide slot.

7. Operating device according to claim 4 wherein the multipoint guide comprises at least two said straight slide slots extending parallel to each other in the sliding direction of operating element, at least two circularly arc-shaped slide slots that are concentric and share a common center of curvature, and at least three slide pins that coact with the slide slots.

8. Operating device according to claim 7 wherein, in the position of the operating element corresponding to the closed position of the cover, said slide pins, except for at most one of said slide pins, are at respective outlets of the circularly arc-shaped slide slots into the straight slide slots.

9. Operating device according to claim 8 wherein said common center of curvature of the circularly arc-shaped slide slots lies on an imaginary extension of one of said straight guide slots and wherein, in the position of operating element corresponding to the closed position of the cover, each of the slide pins is at an outlet of a respective circularly arc-shaped slide slot into a straight slide slot.

10. Operating device according to claim 7 wherein at least one ball detent means for reasonably stopping said operating element in at least one predetermined position with reference to transmitter housing is provided.

11. Operating device according to claim 7 wherein the operating element is slidably guided between two parallel side walls of the transmitter housing and is connected to a contact carrier placed on an outer side of one of said transmitter housing side walls, and wherein the transmitter housing has attached thereto a separate side part that supports, on an inner side facing said one housing side wall, at a distance from the latter, at least one contact path with which at least one sliding contact on the contact carrier works.

12. Operating device according to claim 7 wherein at least one ball detent means for reasonably stopping said operating element in at least one predetermined position with reference to transmitter housing is provided.

13. Operating device according to claim 7 wherein the operating element is slidably guided between two parallel side walls of the transmitter housing and is connected to a contact carrier placed on an outer side of one of said transmitter housing side walls, and wherein the transmitter housing has attached thereto a separate side part that supports, on an inner side facing said one housing side wall, at a distance from the latter, at least one contact path with which at least one sliding contact on the contact carrier works.

14. Operating device according to claim 3 wherein at least one ball detent means for reasonably stopping said operating element in at least one predetermined position with reference to transmitter housing is provided.

15. In an operating device for a displaceable cover of a sliding and lifting sunroof of a motor vehicle of the type having a desired value transmitter, an actual value transmitter, and an actuator forming part of a control circuit, by which a desired value signal supplied by the desired value transmitter and corresponding to a respective selected desired position of the cover is compared with an actual value signal supplied by the actual value transmitter corresponding to a respective actual position of the cover and the position of the cover adjusted until actual and desired positions coincide, the improvement wherein an operating element of the desired value transmitter is mounted so as to enable it to slide and swing in a manner corresponding to a cover sliding movement and a swinging out movement of the cover as a means for causing the desired value transmitter to issue a cover swinging movement controlling desired value signal which varies, upon swinging of the operating element, dependent on the respective angle of the operating element and upon sliding the operating element to issue a cover sliding movement controlling desired value signal which varies dependent on the respective sliding position of the operating element; wherein said desired value transmitter is a potentiometer; and wherein at least one sliding contact is attached to the operating element and is in sliding contact with a potentiometer-resistance path that is connected to a housing of the desired value transmitter.

16. In an operating device for a displaceable cover of a sliding and lifting sunroof of a motor vehicle of the type having a desired value transmitter, an actual value transmitter, and an actuator forming part of a control circuit, by which a desired value signal supplied by the desired value transmitter and corresponding to a respective selected desired position of the cover is compared with an actual value signal supplied by the actual value transmitter corresponding to a respective actual position of the cover and the position of the cover adjusted until actual and desired positions coincide, the improvement wherein an operating element of the desired value transmitter is mounted so as to enable it to slide and swing in a manner corresponding to a cover sliding movement and a swinging out movement of the cover as a means for causing the desired value transmitter to issue a cover swinging movement controlling desired value signal which varies, upon swinging of the operating element, dependent on the respective angle of the operating element and upon sliding the operating element to issue a cover sliding movement controlling desired value signal which varies dependent on the respective sliding position of the operating element; and wherein at least one ball detent means for reasonably stopping said operating element in at least one predetermined position with reference to transmitter housing is provided.

17. In an operating device for a displaceable cover of a sliding and lifting sunroof of a motor vehicle of the type having a desired value transmitter, an actual value transmitter, and an actuator forming part of a control circuit, by which a desired value signal supplied by the desired value transmitter and corresponding to a respective selected desired position of the cover is compared with an actual value signal supplied by the actual value transmitter corresponding to a respective actual position of the cover and the position of the cover adjusted until actual and desired positions coincide, the improvement wherein an operating element of the desired value transmitter is mounted so as to enable it to slide and swing in a manner corresponding to a cover sliding movement and a swinging out movement of the cover as a means for causing the desired value transmitter to issue a cover swinging movement controlling desired value signal which varies, upon swinging of the operating element, dependent on the respective angle of the operating element and upon sliding the operating element to issue a cover sliding movement controlling desired value signal which varies dependent on the respective sliding position of the operating element; and wherein the operating element is slidably guided between two parallel side walls of the transmitter housing and is connected to a contact carrier placed on an outer side of one of said transmitter housing side walls, and wherein the transmitter housing has attached thereto a separate side part that supports, on an inner side facing said one housing side wall, at a distance from the latter, at least one contact path with which at least one sliding contact on the contact carrier works.

* * * * *